United States Patent [19]

Marrelli

[11] Patent Number: 5,165,450
[45] Date of Patent: Nov. 24, 1992

[54] MEANS FOR SEPARATING A FLUID STREAM INTO TWO SEPARATE STREAMS

[75] Inventor: John D. Marrelli, Houston, Tex.

[73] Assignee: Texaco Inc., White Plains, N.Y.

[21] Appl. No.: 812,460

[22] Filed: Dec. 23, 1991

[51] Int. Cl.⁵ ............................................. F16K 1/18
[52] U.S. Cl. ................................. 137/875; 137/118; 251/129.08
[58] Field of Search ............... 251/129.05, 129.08, 251/129.11; 137/872, 875, 118, 172; 210/533

[56] References Cited

U.S. PATENT DOCUMENTS

| 2,114,653 | 4/1983 | Danel | 137/118 |
| 3,214,099 | 10/1965 | Capps | 236/76 X |
| 3,496,261 | 2/1970 | Yarr | 137/118 X |
| 4,815,362 | 3/1989 | Ishizuka et al. | 137/875 X |

Primary Examiner—John C. Fox
Attorney, Agent, or Firm—Robert A. Kulason; James J. O'Loughlin; Ronald G. Gillespie

[57] ABSTRACT

Valve means includes a first pipe which receives a signal fluid stream. The stream is separated into two substreams in accordance with a control signal. A second and third pipe are connected to the separating apparatus provides the substreams external to the valve.

12 Claims, 1 Drawing Sheet

MEANS FOR SEPARATING A FLUID STREAM INTO TWO SEPARATE STREAMS

BACKGROUND OF THE INVENTION

Field of the Invention

The present invention relates to valves in general and, more particularly, to valves which reaches one fluid input and provides two fluid outputs.

SUMMARY OF THE INVENTION

Valve means includes a first pipe which receives a signal fluid stream. The stream is separated into two substreams in accordance with a control signal. A second and third pipe are connected to the separating apparatus provides the substreams external to the valve.

The objects and the advantages of the invention will appear more fully hereinafter from a consideration of the detailed description which follows, taken together with the accompanying drawings, wherein one embodiment of the invention is illustrated by way of example. It is to be expressly understood, however, that the drawings are for illustration purposes only and not to be construed as defining the limits of the invention.

DESCRIPTION OF THE INVENTION

Figure 1:
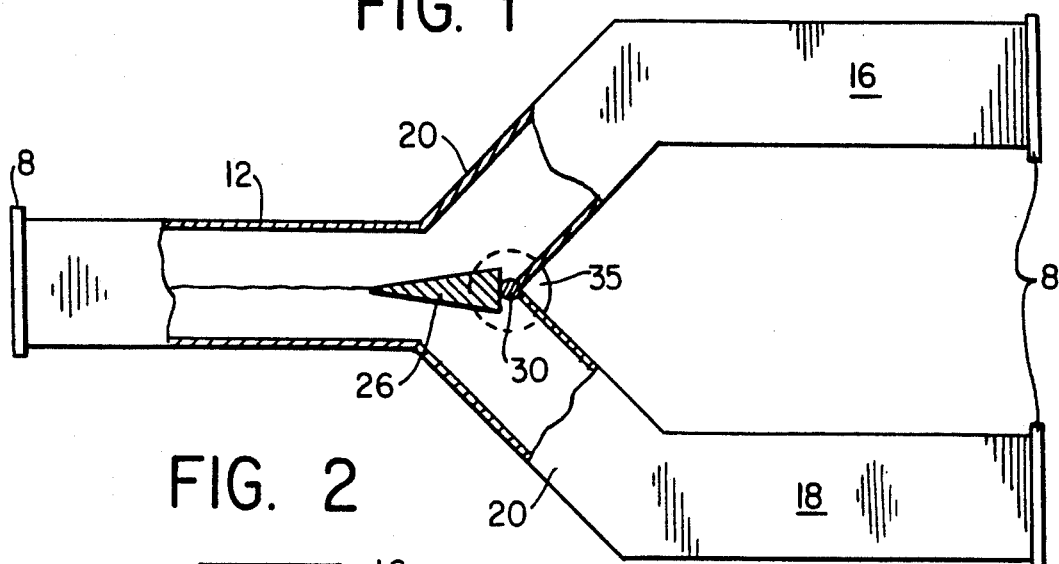
FIG. 1 is a side view of valve means constructed in accordance with the invention.
Figure 2:
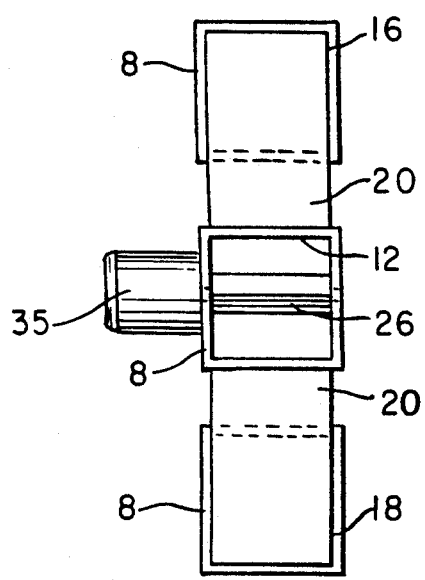
FIG. 2 is an end view of the valve means shown in FIG. 1.

FIG. 1 shows a side view of a valve means, including a mounting flange 8 affixed to a pipe 12. The cross-sectional area of pipe 12 is rectangular in shape as shown in FIG. 2. Pipe 12 is connected to two separate rectangular pipes, 16 and 18 by a "Y" member 20. In "Y" member 20, there is a moveable member 26 whose position is controlled by a shaft 30. As shaft 30 is rotated, as explained hereinafter, moveable member 26 move accordingly. Pipes 16, 18 also have mounting flanges 8 attached to them.

Figure 3:
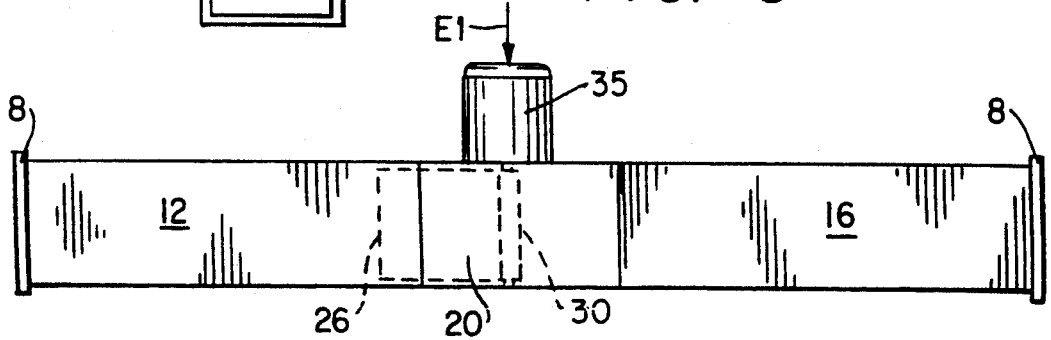
FIG. 3 is a top view of the valve means shown in FIG. 1.

With reference to FIG. 3, which is a top view of the valve mean, we can see a stepper motor 35 which is connected to shaft 30 and positions shaft 30, in accordance with a signal E1.

In operation, there is a single stream having stratified layers. Generally this/type of stream is disclosed in U.S. application Ser. No. 07/814,534, filed Dec. 30, 1991. However, the present invention may be used in any situation where it is desirable to split a single stream into two separate streams. The objective of the valve means is to use moveable member 26 to separate the stratified layers into two separate streams which are provided to pipes 16 and 18.

Figure 4:
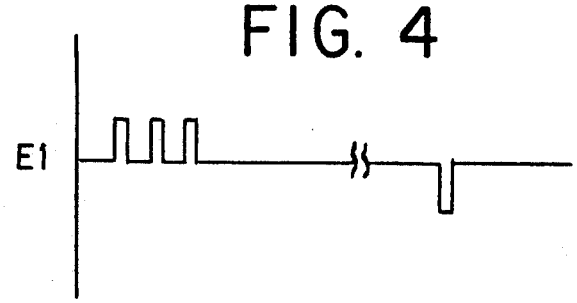
FIG. 4 is an example of a pulse signal utilized in the practice of the present invention.

In practice, a system such as described in the aforementioned application utilizes a water-cut monitor to monitor the water-cut of two separate streams. That system then develops pulse signals in accordance with the monitoring. Thus, with reference to FIG. 4, which is only shown for an example, signal E1 may at some period of time provide three positive pulses to stepper motor 35. Stepper motor 35 is arranged with shaft 30 so that it will rotate shaft 30 clockwise, in response to a positive pulse, a predetermined angular distance, and rotate shaft 30 counter clockwise the same predetermined angular distance in response to a negative pulse. Thus, the three positive pulses in FIG. 4, represent a command to shaft 30 to rotate moveable member 26 a desired angular distance (3 X times the predetermined angular distance) which would cause more of the single stream to flow through pipe 18, and less of the single stream to flow through pipe 16. At a later point in time, the water-cut monitor of the aforementioned application determines that gate member 26 has to be moved again and provides a negative pulse. The negative pulse causes stepper motor 35 to rotate member 26 counter clockwise the predetermined angular distance.

It should be noted that because of the limitation of pipe 12, it would be desirable to have stops provided with stepper motor 35 so that moveable member 26 does not try to rotate through pipe 12, but stop at a small incremental distance just short of contact with pipe 12.

What is claimed is:

1. Valve means comprising:
    first pipe means for receiving a single stratified liquid stream;
    separating means connected to the first pipe means and receiving a control signal for separating the stratified stream into two layer substreams in accordance with the control signal, and
    second and third pipe means connected to the separating means for providing the layer substream as output streams.

2. Means as described in claim 1 in which the separating means includes:
    a body having an inlet connected to the first pipe means, a first outlet connected to the second pipe means and a second outlet connected to the third pipe means,
    moveable means located within the body for splitting the stream into the two substreams
    and means located outside of the body for positioning the moveable means in accordance with the control signal so as to control the sizes of the substream.

3. Means as described in claim 2 in which the moveable means includes:
    a moveable member which does the splitting of the stratified stream, and
    a shaft, affixed to the moveable member, extends outside of the body and is connected to the positioning means.

4. Means as described in claim 3 in which the positioning means is a stepper motor receiving the control signal which rotates the shaft in accordance with the control signal.

5. Means as described in claim 4 in which the control signal is a pulse signal and the stepper motor rotates the shaft a predetermined number of degrees clockwise in response to a pulse of one polarity in the control signal and counter clockwise in response to a pulse of an opposite polarity in the control signal.

6. Means as described in claim 3 in which the control signal is DC signal and the positioning means is a motor connected to the shaft which rotates the shaft in accordance with the DC signal.

7. Stratified stream separating means comprising:

receiving means for receiving a stratified liquid stream including substantially two layers of fluid of different densities, separating means connected to the receiving means and receiving a control signal for separating the two layers of the stratified stream into two separate layer substream in accordance with the control signal, first and second output means connected to the separating means for providing the layer substream as output streams.

8. Means as described in claim 7 in which the separating means includes:

a body having an inlet connected to the receiving means, a first outlet connected to the first output means and a second outlet connected to the second output means, moveable means located within the body for splitting the steam stream into the two layers of the stratified stream, and means located outside of the body for positioning the moveable means in accordance with the control signal so as to control the sizes of the layer substream.

9. Means as described in claim 8 in which the moveable means includes:

a moveable member which does the splitting of the stratified stream, and a shaft, affixed to the moveable member, extends outside of the body and is connected to the positioning means.

10. Means as described in claim 9 in which the positioning means is a stepper motor receiving the control signal which rotates the shaft in accordance with the control signal.

11. Means as described in claim 10 in which the control signal is a pulse signal and the stepper motor rotates the shaft a predetermined number of degree clockwise in response to a pulse of one polarity in the control signal and counter clockwise in response to a pulse of an opposite polarity in the control signal.

12. Means as described in claim 10 in which the control signal is DC signal and the positioning means is a motor connected to the shaft which rotates the shaft in accordance with the DC signal.

* * * * *